(12) United States Patent
Kikuchi et al.

(10) Patent No.: US 12,189,807 B2
(45) Date of Patent: Jan. 7, 2025

(54) ENCRYPTED DATA ANALYSIS DEVICE, ENCRYPTED DATA ANALYSIS METHOD, AND PROGRAM

(71) Applicant: NIPPON TELEGRAPH AND TELEPHONE CORPORATION, Tokyo (JP)

(72) Inventors: Ryo Kikuchi, Tokyo (JP); Gen Takahashi, Tokyo (JP); Koki Hamada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 272 days.

(21) Appl. No.: 17/791,833

(22) PCT Filed: Jan. 14, 2020

(86) PCT No.: PCT/JP2020/000861
§ 371 (c)(1),
(2) Date: Jul. 8, 2022

(87) PCT Pub. No.: WO2021/144840
PCT Pub. Date: Jul. 22, 2021

(65) Prior Publication Data
US 2023/0090900 A1    Mar. 23, 2023

(51) Int. Cl.
*G06F 21/62* (2013.01)
*G06F 21/60* (2013.01)
(52) U.S. Cl.
CPC ........ *G06F 21/6227* (2013.01); *G06F 21/602* (2013.01)

(58) Field of Classification Search
CPC ............... G06F 21/6227; G06F 21/602; G06F 2221/2111; G06F 2221/2151; G06F 21/6254; G09C 1/00
See application file for complete search history.

(56) References Cited

U.S. PATENT DOCUMENTS 8,862,178 B2 * 10/2014 Krishnaswamy ... H04W 12/088
370/255
11,275,851 B2 * 3/2022 Zhai .................... G06F 21/6227
(Continued)

FOREIGN PATENT DOCUMENTS

DE        102022107735 A1 * 10/2022  ........... G06F 21/602

OTHER PUBLICATIONS

Lozada, "Privacy of Contextual Information in Wireless Sensor Networks", 2015, Dissertation Submitted to the Faculty of the Dept. of Electrical and Computer Engineering, The University of Arizona, p. 1-159.*

(Continued)

*Primary Examiner* — Christopher A Revak (57) ABSTRACT

The encrypted data analysis device includes a sorting unit that sorts by [Time Information] and then sorts by [User ID] an encrypted data set group including a plurality of encrypted data sets, each of the plurality of encrypted data sets including a [Location ID], the [User ID], and the [Time Information], an encoding unit that generates a [Flow], and encoding the [Location ID] extracted, and an equal sign determination unit that determines whether a [User ID] and another [User ID] adjacent to each other are equal, and when not equal, replaces a corresponding [Flow] with a [predetermined value that represents invalid].

16 Claims, 3 Drawing Sheets

(56) References Cited

U.S. PATENT DOCUMENTS

| | | | |
|---|---|---|---|
| 11,658,952 B1* | 5/2023 | Mahdavi | H04L 9/085 |
| | | | 713/153 |
| 2008/0088480 A1* | 4/2008 | Rozum | G08G 1/096775 |
| | | | 340/933 |
| 2011/0107084 A1* | 5/2011 | Hubner | H04W 12/033 |
| | | | 713/153 |
| 2018/0069791 A1* | 3/2018 | Dong | H04L 45/745 |
| 2018/0206076 A1* | 7/2018 | Chen | H04W 4/029 |
| 2019/0058694 A1* | 2/2019 | Hussain | H04L 12/4641 |
| 2020/0244728 A1* | 7/2020 | Jha | H04L 9/30 |
| 2020/0313848 A1* | 10/2020 | Troia | H04W 12/71 |
| 2022/0164372 A1* | 5/2022 | Krishna | G06F 16/2255 |

OTHER PUBLICATIONS

Kozaki et al. (2018) "Collection of GPS Movement History and LOD of Movement Trajectory Using Open Data—Example of Demonstration Experiment at International Conference ISWC2016—" Information Processing Society of Japan, Digital Practice, vol. 9 No. 1.

* cited by examiner

ENCRYPTED DATA ANALYSIS DEVICE, ENCRYPTED DATA ANALYSIS METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/000861, filed on 14 Jan. 2020, the disclosure of which is hereby incorporated herein by reference in its entirety.

TECHNICAL FIELD

The present invention relates to an encrypted data analysis device, an encrypted data analysis method, and a program for analyzing data that is being kept secret.

BACKGROUND ART

Flow line analysis that analyzes "how a person has moved between stores, facilities, stations, etc." can be used for optimizing the locations of the stores, investigating the need for paths, and the like. Examples of the existing techniques for flow line analysis include NPL 1.

CITATION LIST

Non Patent Literature

NPL 1: Kouji Kozaki, Teruaki Yokoyama, Yoshiaki Fukami "Collection of GPS Movement History and LOD of Movement Trajectory Using Open Data—Example of Demonstration Experiment at International Conference ISWC2016—" Information Processing Society of Japan, Digital Practice, Vol. 9 No. 1 (January 2018)

SUMMARY OF THE INVENTION

Technical Problem

In creating flow line data from customer data of a store, for example, it is necessary to collect customer data of the store on a server, but the customer data of the store is information related to the management and it is difficult for the store to provide the customer data. In addition, in a case where an entity that calculates the flow line analysis and an entity that uses the flow line analysis are different, the flow line analysis result will be passed to the entity that calculates the flow line analysis. Because the flow line analysis result is a movement history related to personal privacy, it is problematic that the movement history can be seen by the entity that calculates the flow line analysis. Furthermore, in a case where the number of people who have moved from one store to another is extremely small (for example, one person), it is highly likely that the individual who has moved can be identified.

In light of the foregoing, an object of the present invention is to provide an encrypted data analysis device that can analyze encrypted data that is being kept secret.

Means for Solving the Problem

The encrypted data analysis device according to the present invention includes a sorting unit, an encoding unit, and an equal sign determination unit. An [x] represents the encrypted data of an x.

The sorting unit sorts by [Time Information] and then sort by [User ID] an encrypted data set group including a plurality of encrypted data sets, each of the plurality of encrypted data sets including a [Location ID], the [User ID], and the [Time Information] obtained by encrypting analysis target data of an analysis target data set of a Location ID, a User ID, and Time information indicating that a certain user has stayed at a certain location at certain time. The encoding unit generates a [Flow] by extracting the [Location ID] according to the number of hops in a sorted order, the number of hops corresponding to the number of transitions between preset locations, and encoding the [Location ID] extracted. The equal sign determination unit determines whether a [User ID] and another [User ID] adjacent to each other are equal, and when not equal, replaces a corresponding [Flow] with a [predetermined value that represents invalid].

Effects of the Invention

According to the encrypted data analysis device of the present invention, encrypted data can be analyzed while the data is kept concealed.

DESCRIPTION OF EMBODIMENTS

Hereinafter, embodiments of the present invention will be described in detail. Components having the same functions are denoted by the same reference signs, and redundant description thereof will be omitted.

In the following embodiments, an apparatus, a method, and a program for creating flow line data, for example, with the customer data at the store kept encrypted, by using a technique called secure computing, which can perform calculation of encrypted data while keeping the data encrypted, will be disclosed. This allows the required flow line data to be obtained without the customer data at the store leaking to anyone. The flow line data of the calculation result is encrypted, and even the entity who calculates it cannot see the data. In addition, in order to reduce the risk of identifying an individual, a method of deleting a part of the flow line data in which the number of people who have moved is small is also disclosed as an option.

First Embodiment

Figure 1:
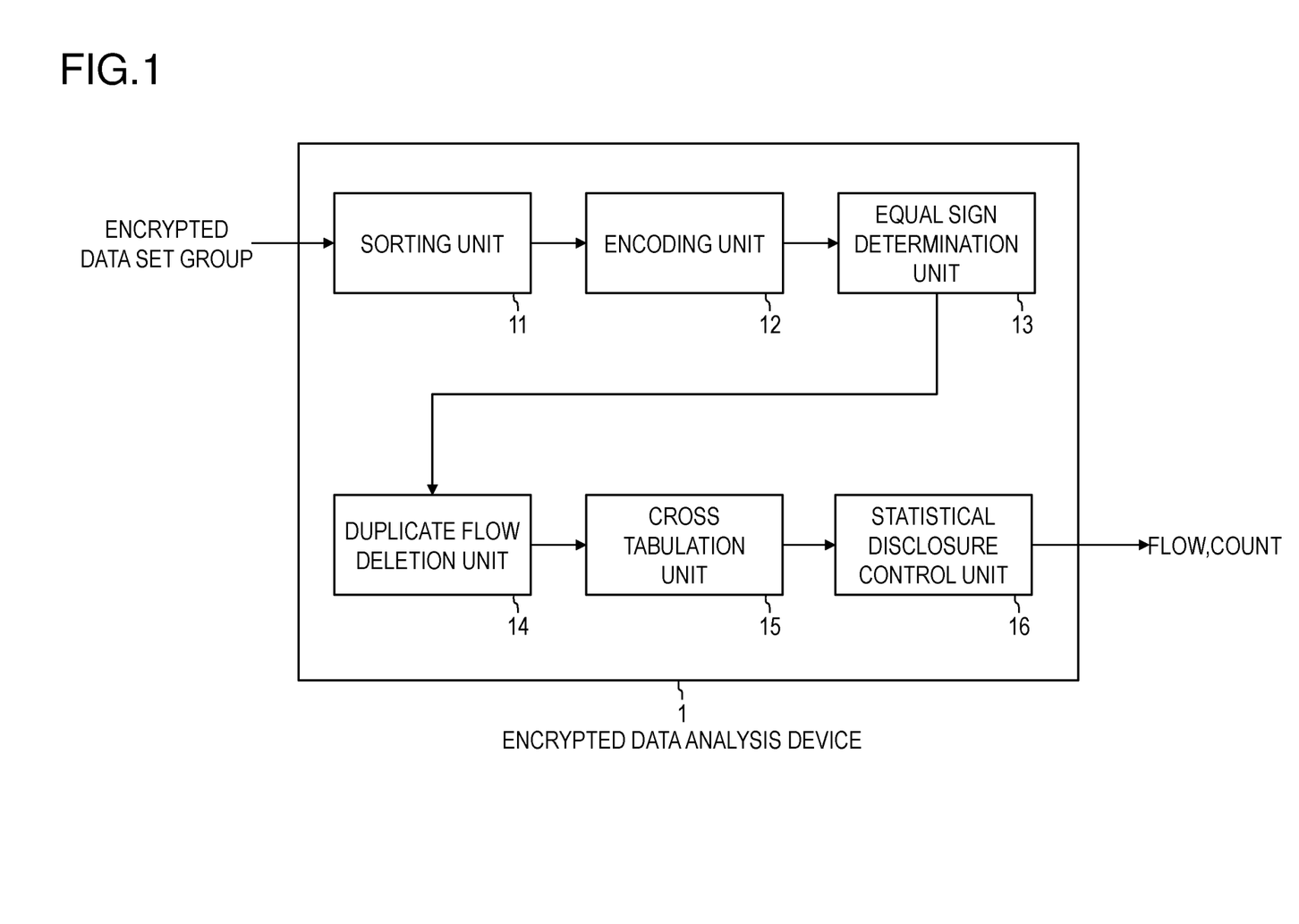
FIG. 1 is a block diagram illustrating a configuration of an encrypted data analysis device according to a first embodiment.

A configuration of the encrypted data analysis device according to a first embodiment will be described below with reference to FIG. 1. As illustrated in the figure, the encrypted data analysis device 1 of the present embodiment includes a sorting unit 11, an encoding unit 12, an equal sign determination unit 13, a duplicate flow deletion unit 14, a cross tabulation unit 15, and a statistical disclosure control unit 16.

(Location ID, User ID, Time Information) indicating that a certain user has stayed at a certain location at a certain time is referred to as an analysis target data set. Data ([Location ID], [User ID], [Time Information]) obtained by encrypting each analysis target data in the analysis target data set is referred to as an encrypted data set. The encrypted data analysis device 1 is input with an encrypted data set group including a plurality of encrypted data sets. [x] means the encrypted data of x.

Tables 1 and 2 disclose examples of groups of encrypted data sets when Location ID is Store ID.

TABLE 1

| [Store (Location)] [LOCATION ID (STORE ID)] | [User] [USER ID] | [Time] [TIME INFORMATION] |
|---|---|---|
| [A] | [0001] | [10:00] |
| [A] | [0004] | [10:30] |
| [A] | [0002] | [11:00] |
| [A] | [0003] | [11:30] |
| [A] | [0002] | [14:00] |

TABLE 2

| [Store (Location)] [LOCATION ID (STORE ID)] | [User] [USER ID] | [Time] [TIME INFORMATION] |
|---|---|---|
| [B] | [0003] | [9:00] |
| [B] | [0004] | [10:00] |
| [B] | [0001] | [11:00] |
| [B] | [0002] | [13:00] |
| [B] | [0002] | [15:00] |

From Tables 1 and 2, for example, information such as user 0001 moving from store A to B and user 0003 moving from store B to A can be found. The flow line analysis shown in Tables 3 and 4 below can be performed. The number of transitions (number of hops) between locations (stores) is shown in the corresponding separate table.

TABLE 3

FLOW LINE ANALYSIS RESULT (1HOPS)

| [Flow] [FLOW] | [Count] [COUNT] |
|---|---|
| [A→B] | [50] |
| [A→C] | [2] |
| [A→D] | [10] |
| [B→A] | [10] |
| ... | ... |

TABLE 4

FLOW LINE ANALYSIS RESULT (3HOPS)

| [Flow] [FLOW] | [Count] [COUNT] |
|---|---|
| [A→B→A] | [10] |
| [A→B→C] | [20] |
| [A→B→D] | [10] |
| [B→A→B] | [3] |
| ... | ... |

Flow Line Analysis of Encrypted Data

The flow line analysis consists schematically of the following four steps:

(Step 1) A terminal at each location (a terminal of each store in the above example) encrypts a group of analysis target data sets to generate an encrypted data set group and transmits the encrypted data set group to the encrypted data analysis device 1.

(Step 2) The encrypted data analysis device 1 obtains a flow line analysis result ([Flow], [Count]) in the encrypted state from the encrypted data set group encrypted.

(Step 3) The encrypted data analysis device 1 transmits the encrypted flow line analysis result ([Flow], [Count]) to the terminal at each location (the terminal of each store in the above example) that is an entity that receives the result of the flow line analysis.

(Step 4) The terminal at each location (the terminal of each store in the above example) decrypts the flow line analysis result ([Flow], [Count]) to obtain the flow line analysis result (Flow, Count).

The encryption in step 1 may be secret sharing or fully homomorphic encryption. However, it is required that stable sorting that rearranges the order and If-then that branches the process based on the result of comparing two values can be calculated while data is kept encrypted.

Step 2, which is a main operation of the encrypted data analysis device 1, will be described in detail below. Regarding step 2, an example of calculating the flow line analysis result in one hop in a case where the data examples shown in Tables 1 and 2 are input will be described.

First, the store A and the store B transmit the groups of encrypted data sets to the encrypted data analysis device 1. The encrypted data analysis device 1 may be a third party organization, or any of the store A and the store B may function as the encrypted data analysis device 1.

The sorting unit 11 of the encrypted data analysis device 1 may combine the groups of encrypted data sets to obtain the following results.

TABLE 5

| [Store (Location)] [LOCATION ID (STORE ID)] | [User] [USER ID] | [Time] [TIME INFORMATION] |
|---|---|---|
| [A] | [0001] | [10:00] |
| [A] | [0004] | [10:30] |
| [A] | [0002] | [11:00] |
| [A] | [0003] | [11:30] |
| [A] | [0002] | [14:00] |
| [B] | [0003] | [9:00] |
| [B] | [0004] | [10:00] |
| [B] | [0001] | [11:00] |
| [B] | [0002] | [13:00] |
| [B] | [0002] | [15:00] |

Figure 2:
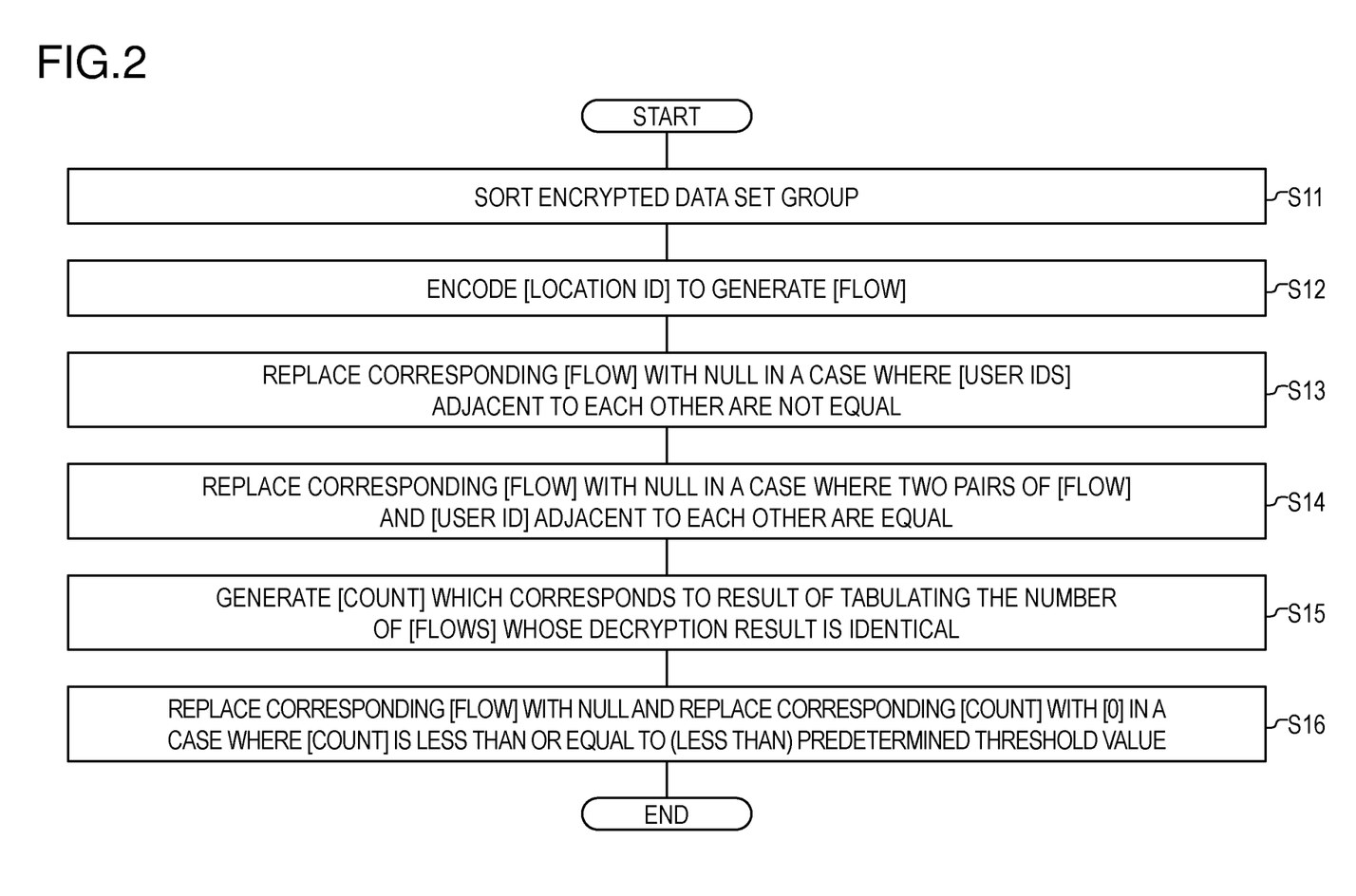
FIG. 2 is a flowchart illustrating the operation of the encrypted data analysis device according to the first embodiment.

The sorting unit 11 sorts the encrypted data set group by [Time Information], and then sorts the encrypted data set group by [User ID] (S11). The sort results are shown in Table 6.

TABLE 6

| [Store (Location)] [LOCATION ID (STORE ID)] | [User] [USER ID] | [Time] [TIME INFORMATION] |
|---|---|---|
| [A] | [0001] | [10:00] |
| [B] | [0001] | [11:00] |
| [A] | [0002] | [11:00] |
| [B] | [0002] | [13:00] |
| [A] | [0002] | [14:00] |
| [B] | [0002] | [15:00] |
| [B] | [0003] | [9:00] |
| [A] | [0003] | [11:30] |
| [A] | [0004] | [10:00] |
| [B] | [0004] | [11:00] |

The encoding unit 12 generates [Flow] by extracting [Location ID] in units of the number of hops (one in this example), according to the sorted order, and encoding the extracted [Location ID] (S12). The encoding results are shown in Table 7.

TABLE 7

| [Store (Location)] [LOCATION ID (STORE ID)] | [User] [USER ID] | [Time] [TIME INFORMATION] | [Flow] [FLOW] |
|---|---|---|---|
| [A] | [0001] | [10:00] | |
| [B] | [0001] | [11:00] | [A→B] |
| [A] | [0002] | [11:00] | [B→A] |
| [B] | [0002] | [13:00] | [A→B] |
| [A] | [0002] | [14:00] | [B→A] |
| [B] | [0002] | [15:00] | [A→B] |
| [B] | [0003] | [9:00] | [B→B] |
| [A] | [0003] | [11:30] | [B→A] |
| [A] | [0004] | [10:00] | [A→A] |
| [B] | [0004] | [11:00] | [A→B] |

Next, [Flow] of the boundary part where the user changes is deleted (invalidated). Specifically, the equal sign determination unit 13 determines whether or not adjacent [User ID] are equal to each other, and if they are not equal, replaces the corresponding [Flow] with [NULL] as a [predetermined value that represents invalid] (S13). The results of replacing the corresponding [Flow] with NULL are shown in Table 8. [Location ID (Store ID)] and [Time Information] are not shown.

TABLE 8

| [User] [USER ID] | [Flow] [FLOW] |
|---|---|
| [0001] | [A→B] |
| [0002] | [NULL] |
| [0002] | [A→B] |
| [0002] | [B→A] |
| [0002] | [A→B] |
| [0003] | [NULL] |
| [0003] | [B→A] |
| [0004] | [NULL] |
| [0004] | [A→B] |

The equal sign determination unit 13 sorts the results by [Flow] (S13). At this point, all the paths of 1 hops are obtained. The sort results are shown in Table 9.

TABLE 9

| [User] [USER ID] | [Flow] [FLOW] |
|---|---|
| [0001] | [A→B] |
| [0002] | [A→B] |
| [0002] | [A→B] |
| [0004] | [A→B] |
| [0002] | [B→A] |
| [0003] | [B→A] |
| [0002] | [NULL] |
| [0003] | [NULL] |
| [0004] | [NULL] |

At this point, if there is a user who moved along the same path twice, the movements are counted twice. Some applications may want the number of unique people who have actually moved, so here is indicated an option for deleting duplicates. Specifically, in a case where two pairs of ([Flow], [User ID]) adjacent to each other are equal, the duplicate flow deletion unit 14 replaces the corresponding [Flow] with [NULL] as a [predetermined value that represents invalid] (S14). Duplicate flow deletion (invalidation) results are shown in Table 10.

TABLE 10

| [Flow] [FLOW] |
|---|
| [A→B] |
| [A→B] |
| [NULL] |
| [A→B] |
| [B→A] |
| [B→A] |
| [NULL] |
| [NULL] |
| [NULL] |

The duplicate flow deletion unit 14 sorts the results by [Flow] (S14). The sort results are shown in Table 11.

TABLE 11

| [Flow] [FLOW] |
|---|
| [A→B] |
| [A→B] |
| [A→B] |
| [B→A] |
| [B→A] |
| [NULL] |
| [NULL] |
| [NULL] |
| [NULL] |

Next, a cross tabulation is performed optionally to obtain the flow line analysis results. Specifically, the cross tabulation unit 15 generates [Count], which corresponds to the result of tabulating the number of [Flows] whose decryption result is identical (S15). The tabulation results are shown in Table 12.

TABLE 12

| [Flow] [FLOW] | [Count] [COUNT] |
|---|---|
| [A→B] | [3] |
| [B→A] | [2] |
| [NULL] | [0] |
| [NULL] | [0] |
| [NULL] | [0] |
| [NULL] | [0] |
| [NULL] | [0] |
| [NULL] | [0] |
| [NULL] | [0] |

Finally, as an option, in order to reduce the risk of identifying an individual, a method of deleting (invalidating) data in a case where the number of Count is small can be considered. Furthermore, in a case where the data after tabulation is to be used for further processing, an option to reduce the number of records can also be considered. Specifically, in a case where [Count] is less than or equal to a predetermined threshold value or less than a predetermined threshold value, the statistical disclosure control unit 16 replaces the corresponding [Flow] with [NULL] as a [predetermined value that represents invalid] and replaces the corresponding [Count] with [0] (S16). The replacement results are shown in Table 13 in a case where the threshold value is 2 and [Flow] less than or equal to the threshold value=2 is replaced.

TABLE 13

| [Flow] [FLOW] | [Count] [COUNT] |
|---|---|
| [A→B] | [3] |
| [NULL] | [0] |
| [NULL] | [0] |
| [NULL] | [0] |
| [NULL] | [0] |
| [NULL] | [0] |
| [NULL] | [0] |
| [NULL] | [0] |
| [NULL] | [0] |

The statistical disclosure control unit 16 deletes unnecessary records (S16). The record deletion results are shown in Table 14.

TABLE 14

| [Flow] [FLOW] | [Count] [COUNT] |
|---|---|
| A→B | [3] |

Algorithm

The algorithm for implementing steps S11 to S16 will be described below, and each step will be supplementarily described.

As described above, the encrypted data of x is written as [x], the vector is written as x→=($x_1$, . . . , $x_n$), and [x→]=([$x_1$], . . . , [$x_n$]). The encryption that allows for performing the following operations while keeping data encrypted, such as secret sharing (for example, Reference NPL 1) or homomorphic encryption (for example, Reference NPL 2), is used.

Reference NPL 1: D. Ikarashi, R. Kikuchi, K. Hamada, and K. Chida. Actively private and correct MPC scheme in t<n/2 from passively secure schemes with small overhead. IACR Cryptology ePrint Archive, 2014:304, 2014.

Reference NPL 2: Z. Brakerski, C. Gentry, and V. Vaikuntanathan. Fully homomorphic encryption without bootstrapping. Electronic Colloquium on Computational Complexity (ECCC), 18:111, 2011.

Addition/Subtraction, Constant Multiple

Secret sharing and homomorphic encryption naturally support addition/subtraction, and constant multiple. This is written as c[a]±[b]±d=[ca±b±d], and the like.

Multiplication

For secret sharing, multiplication can be calculated by the method described in Reference NPL 1, and for homomorphic encryption, multiplication can be calculated by homomorphic operation. This is written as [c]←Mult([a], [b]) (where c=ab).

Stable Sorting

Stable sorting is an operation of rearranging an input [x→]=([$x_1$], . . . , [$x_n$]) to obtain [x'→]=([$x'_1$], . . . , [$x'_n$]) satisfying $x'_i \le x'_{i+1}$ for i∈{1, . . . , n−1}. However, in a case where $x'_i = x'_{i+1}$, the order of the original x→ is prioritized. More specifically, stable sorting consists of the following two algorithms (GenPerm and Sort).

[π]←GenPerm([x→]): The encrypted version of the permutation π that rearranges x→ is output.

[x→]'←Sort([π], [x→]): x→' which is a result of rearranging x→ by applying π to x→ is calculated while the data is kept encrypted.

For simplicity, sorting multiple vectors with the same permutation is written as ([x→]', [y→]')←Sort([π], ([x→], [y→])), and the like. A known configuration method is a sorting network. Furthermore, there are streamlined methods such as Reference NPL 3, in the case of secret sharing.

Reference NPL 3: K. Chida, K. Hamada, D. Ikarashi, R. Kikuchi, N. Kiribuchi, and B. Pinkas. An efficient secure three-party sorting protocol with an honest majority. IACR Cryptology ePrint Archive, 2019:695, 2019.

Equal Sign Determination

Equal sign determination takes [x] and [y] as inputs, and outputs [e] being 1 if x=y and 0 if x≠y. This is written as follows.

$$[e] \leftarrow EQ([x], [y]), \text{ where } e = \begin{cases} 1 & \text{if } x = y \\ 0 & \text{otherwise} \end{cases} \quad \text{[Math. 1]}$$

In addition, in a case of making equal sign determination of a plurality of elements, equal sign determination is also written as follows.

$$[e] \leftarrow EQ([a], [b]), ([c], [d]) \text{ where } e = \begin{cases} 1 & \text{if } a = c \text{ and } b = d \\ 0 & \text{otherwise} \end{cases} \quad \text{[Math. 2]}$$

Generally, if the data is encrypted in a bit representation, it is only required to perform circuit calculation as to whether or not each bit of [x−y] is 0, and the circuit calculation can be calculated by addition/subtraction and multiplication. If the data is encrypted in an integer representation, the data is changed to a bit representation using bit decomposition (Reference NPL 4) and the circuit is calculated in the same manner. If the data is encrypted on mod p, $[(x-y)^{p-1}]$ may be calculated using multiplication.

Reference NPL 4: R. Kikuchi, D. Ikarashi, T. Matsuda, K. Hamada, and K. Chida. Efficient bit-decomposition and modulus-conversion protocols with an honest majority. In ACISP 2018, pages 64-82, 2018.

Comparison

Comparison takes [x] and y as inputs, and outputs [e] being 1 if x≤y or 0 otherwise.

$$[e] \leftarrow \text{COMPARE}([x], y), \text{ where } e = \begin{cases} 1 & \text{if } x \le y \\ 0 & \text{otherwise} \end{cases} \quad \text{[Math. 3]}$$

Generally, if the data is encrypted in a bit representation, it is only required to calculate the comparison circuit. If the data is encrypted in an integer representation, the data is changed to a bit representation using bit decomposition (Reference NPL 4) and the circuit is calculated in the same manner. If the data is encrypted on mod p, (Reference NPL 5) or the like may be used.

Reference NPL 5: T. Nishide and K. Ohta. Multiparty computation for interval, equality, and comparison without bit-decomposition protocol. In Public Key Cryptography, pages 343-360, 2007.

Tabulation Function (Count)

Cross tabulation. It takes [x→] as input, and outputs ([x→'$_i$], [c→$_i$]). Where, when the pattern of values taken by $x_i$ is m, $$x'_i \notin \{x'_j\}_{j \ne i, 1 \le j \le m} \quad \text{[Math. 4]}$$

and $c_i = |\{x'_j | x'i = x'_j, 1 \le j \le n\}|$ for $1 \le i \le m$, and $c_i = 0$ for $m+1 \le i \le n$. This is written as ([x→], [c→])←GroupBy.count([x→]). As an implementation method, there is a method of comparing each $x_i$ with a possible value of $x_i$ and adding the result.

Furthermore, if the result of the tabulation function is to be published, it is only required to simply decrypt [x].

If-Then

If-then is a method that takes Flag [z] ($z \in \{0, 1\}$), and [x] and [y] as inputs, and outputs [x] if z=1 or [y] if z=0. This is written as follows.

$$[e] \leftarrow \mathit{IFTHEN}([z]?[x]:[y]), \text{ where } e = \begin{cases} x & \text{if } z = 1 \\ y & \text{otherwise} \end{cases} \quad \text{[Math. 5]}$$

It can be realized by Mult([z], [x])+Mult([1−f], [y]), for example.

Input

In order to express the operation of the encrypted data analysis device 1 by an algorithm, the input to the encrypted data analysis device 1 is defined as shown in Table 15, and the output from the encrypted data analysis device 1 is defined as shown in Table 16. In particular, the column is also written as [s→] or the like.

TABLE 15

| [Store (Location)] | [User] | [Time] |
|---|---|---|
| [$s_1$] | [$u_1$] | [$t_1$] |
| [$s_2$] | [$u_2$] | [$t_2$] |
| ... | ... | ... |
| [$s_m$] | [$u_m$] | [$t_m$] |

TABLE 16

| [Flow] | [Count] |
|---|---|
| [$f_1$] | [$c_1$] |
| ... | ... |
| [$f_n$] | [$c_n$] |

Specific Algorithms

NULL is a special number that is predetermined. For example, NULL is −1. Encode is such that the output is different with a high probability if the concealed input is different. It is desirable to use Encode that can be calculated efficiently in secure computing. For example, when the Store ID is h-bit data and Encode of [$s'_i$], [$s'_{i-1}$], ..., [$s'_{i-n}$] is performed, the following calculation may be performed.

$$|\Sigma_{j=0}^{n} 2^{jh} [s'_{i-n+j}]| \quad \text{[Math. 6]}$$

If it is probabilistically preferable that the size of share is large, $$|\Sigma_{j=0}^{n} \rho_j [s'_{i-n+j}]| \quad \text{[Math. 7]}$$

(where $\rho_i$ is a random number) a hash function may be calculated while data is kept encrypted.

DelMultUsers is a process of processing data so that in a case where the same user moves a plurality of times on the same path, those movements are counted as one time, and specifically, it is Algorithm 2 described later. SDC is a process of performing deletion in a case where the frequency is equal to or less than a certain threshold value k, and specifically, it is Algorithm 3 described later. In addition, DelRecord is a process of deleting a record of NULL, and specifically, it is Algorithm 4 described later.

Algorithm 1

Input: ([s→], [u→], [t→]).

Input indicates an input to the encrypted data analysis device 1.

Output: ([f→], [c→]).

Output indicates an output from the encrypted data analysis device 1.

1: [π]←GenPerm([t→]).

2: ([s→'], [u→'], [t→'])←Sort([π], ([s→], [u→], [t→])).

The first and second lines are the operations of sorting the encrypted data set group by [Time Information] in the operation (S11) of the sorting unit 11.

3: [π]←GenPerm([→']).

4: ([s→"], [u→"], [t→"])←Sort([π'], ([s→'], [u→'], [t→'])).

The third and fourth lines are the operations of sorting the encrypted data set group by [User ID] in the operation (S11) of the sorting unit 11.

5: for i=n+1 to m in parallel do

6: [$f_i$]:=Encode([$s"_i$], [$s"_{i-1}$], [$s"_{i-n}$])

The fifth line is a line that describes an iterative operation. The sixth line represents the operation (S12) of the encoding unit 12.

7: [$e_i$]←Eq([$u"_i$], [$u"_{i-n}$])

8: [$f_i$]←Ifthen([$e_i$]?[$f_i$], [null])

9: [f→']:=([$f'_n$], [$f'_{n+1}$], ..., [$f'_m$])

The seventh to ninth lines indicate the operations of replacing corresponding [Flow] with [NULL] as a [predetermined value that represents invalid] in the operation (S13) of the equal sign determination unit 13.

10: [π"]←GenPerm([f→'])

11: ([f→"], [u→'"])←Sort([π"], ([f→'], [u→"])).

The 10th and 11th lines indicate the operations of sorting by [Flow] of the operation (S13) of the equal sign determination unit 13.

12: [f→'"]←DelMultUsers([f→"], [u→'"])

The 12th line indicates the operation (S14) of the duplicate flow deletion unit 14. DelMultUsers is described in Algorithm 2.

13: ([f→""), [c→])←GroupBy.count([f→'"])

The 13th line indicates the operation (S15) of the cross tabulation unit 15.

14: ([f→""'], [c→'])←SDC(k, [f→""], [c→])

The 14th line indicates the operation of replacing corresponding [Flow] with [NULL] as a [predetermined value that represents invalid] and replacing corresponding [Count] with [0] in a case where [Count] is equal to or less than a predetermined threshold value k, of the operation (S16) of the statistical disclosure control unit 16. SDC is described in Algorithm 3.

15: ([f→"""), [c→"])←DelRecord([f→""'], [c→'])

The 15th line indicates the operation of deleting unnecessary records of the operation (S16) of the statistical disclosure control unit 16. DelRecord is described in Algorithm 4.

16: Output ([f→"""], [c→"])

The 16th line indicates the operation of outputting ([Flow], [Count]) of the encrypted data analysis device 1.

Algorithm 2

Input: Two share vectors ([f→], [u→]) of length m

This indicates that two ([→], [u→]) are input in order to make a comparison in step S14.

Output: [f→'], where $f'_i$=NULL if $f_i=f_{i-1}$ and $u_i=u_{i-1}$.

This indicates that corresponding [Flow] is replaced with [NULL] as a [predetermined value that represents invalid] if two pairs of ([Flow], [User ID]) adjacent to each other are equal and [f→'] is output in step S14.

1: for i=2 to m in parallel do

The first line is a line that describes an iterative operation.

2: $[g_i] \leftarrow \text{Eq}(([f_i], [u_i]), ([f_{i-1}], [u_{i-1}]))$

The second line indicates the operation of determining whether or not two pairs of ([Flow], [User ID]) adjacent to each other are equal.

3: $[f'_i] \leftarrow \text{Ifthen}([g_i]?[\text{NULL}]:[f_i])$

The third line indicates the operation of replacing corresponding [Flow] with [NULL] as a [predetermined value that represents invalid].

4: $[\pi] \leftarrow \text{GenPerm}([f'_i])$

5: $[f''_i] \leftarrow \text{Sort}([\pi], [f''_i])$

The fourth and fifth lines indicate the operations of sorting by [Flow] in the operation (S14) of the duplicate flow deletion unit 14.

6: Output [f→'']

The sixth line indicates the [Flow] output operation.

Algorithm 3

Input: Two share vectors ([f→], [c→]) of length m and threshold k

This means that ([Flow], [Count]) and a threshold value k are input in order to delete unnecessary records.

Output: ([f→'], [c→']), where $c'_i = 0$ and $f'_i = \text{NULL}$ if $c_i \le k$ This indicates replacing Count with 0 and replacing Flow with NULL to output ([Flow], [Count]) in a case where Count is less than or equal to the threshold value k.

1: for i=i to m in parallel do

The first line is a line that describes an iterative operation.

2: $[e_i] \leftarrow \text{Compare}([c_i], k)$

The second line indicates an operation of comparing [Count] with the threshold value k.

3: $([f \rightarrow '], [c \rightarrow ']) \leftarrow \text{Ifthen}([e_i]?([f_i], c_i), ([\text{NULL}], [0]))$ The third line indicates that, based on the comparison result $[e_i]$, an operation of maintaining the original ([Flow], [Count]) or an operation of replacing with ([NULL], [0]) is performed.

4: Output ([f→'], [c→'])

The fourth line indicates the output operation of ([Flow], [Count]).

Algorithm 4

Input: Two share vectors ([f→], [c→]) of length m, which includes t records whose $f_i = \text{NULL}$.

This indicates inputting m number of ([Flow], [Count]) including t number of records in which Flow is NULL.

Output: Two share vectors ([f→'], [c→']) of length m−t, where the t records are deleted.

This indicates deleting the t number of records described above to output the remaining m−t number of ([Flow], [Count]).

1: for i=i to m in parallel do

The first line is a line that describes an iterative operation.

2: $[e_i] \leftarrow \text{Eq}([f_i], [\text{NULL}])$ //can be replaced with $[e_i] \leftarrow \text{Eq}([c_i], [0])$ The second line indicates the determination operation as to whether [Flow] is equal to [NULL].

The second line indicates that it may be replaced with a determination operation as to whether [Count] is equal to [0].

3: $[t] := \sum_{i=1}^{m} [e_i]$

The third line means the counting operation of the number of records in which [Flow] is equal to [NULL].

4: Reveal t

The fourth line means the operation of decrypting [t].

5: Delete last t records of ([f→], [c→])

The fifth line means the operation of deleting t number of records.

Effects Provided by Encrypted Data Analysis Apparatus 1 According to First Embodiment According to the encrypted data analysis device 1 of the first embodiment, the flow line analysis can be performed while the data of each store/facility/location is kept encrypted. It is also possible to reduce the risk of individual identification by deleting the part where only a certain number of people or fewer have moved.

Supplements

The apparatus according to the present invention includes, for example, as single hardware entities, an input unit to which a keyboard or the like can be connected, an output unit to which a liquid crystal display or the like can be connected, a communication unit to which a communication apparatus (for example, a communication cable) capable of communication with the outside of the hardware entity can be connected, a Central Processing Unit (CPU, which may include a cache memory, a register, and the like), a RAM or a ROM that is a memory, an external storage apparatus that is a hard disk, and a bus connected for data exchange with the input unit, the output unit, the communication unit, the CPU, the RAM, the ROM, and the external storage apparatuses. An apparatus (drive) capable of reading and writing from and to a recording medium such as a CD-ROM may be provided in the hardware entity as necessary. An example of a physical entity including such hardware resources is a general-purpose computer.

A program necessary to implement the above-described functions, data necessary for processing of this program, and the like are stored in the external storage apparatus of the hardware entity (for example, the program may be stored not only in the external storage apparatus but in a ROM that is a read-only storage apparatus). For example, data obtained by the processing of the program is appropriately stored in a RAM, the external storage apparatus, or the like.

In the hardware entity, each program and data necessary for the processing of each program stored in the external storage apparatus (or a ROM, for example) are read into a memory as necessary and appropriately interpreted, executed, or processed by a CPU. As a result, the CPU implements a predetermined function (each of components represented by xxx unit, xxx means, or the like).

The present invention is not limited to the above-described embodiment, and appropriate changes can be made without departing from the spirit of the present invention. The processing described in the embodiments are not only executed in time series in the described order, but also may be executed in parallel or individually according to a processing capability of an apparatus that executes the processing or as necessary.

As described above, when a processing function in the hardware entity (the apparatus of the present invention) described in the embodiment is implemented by a computer, processing content of a function that the hardware entity should have is described by a program. By executing this program using the computer, the processing function in the hardware entity is implemented on the computer.

Figure 3:
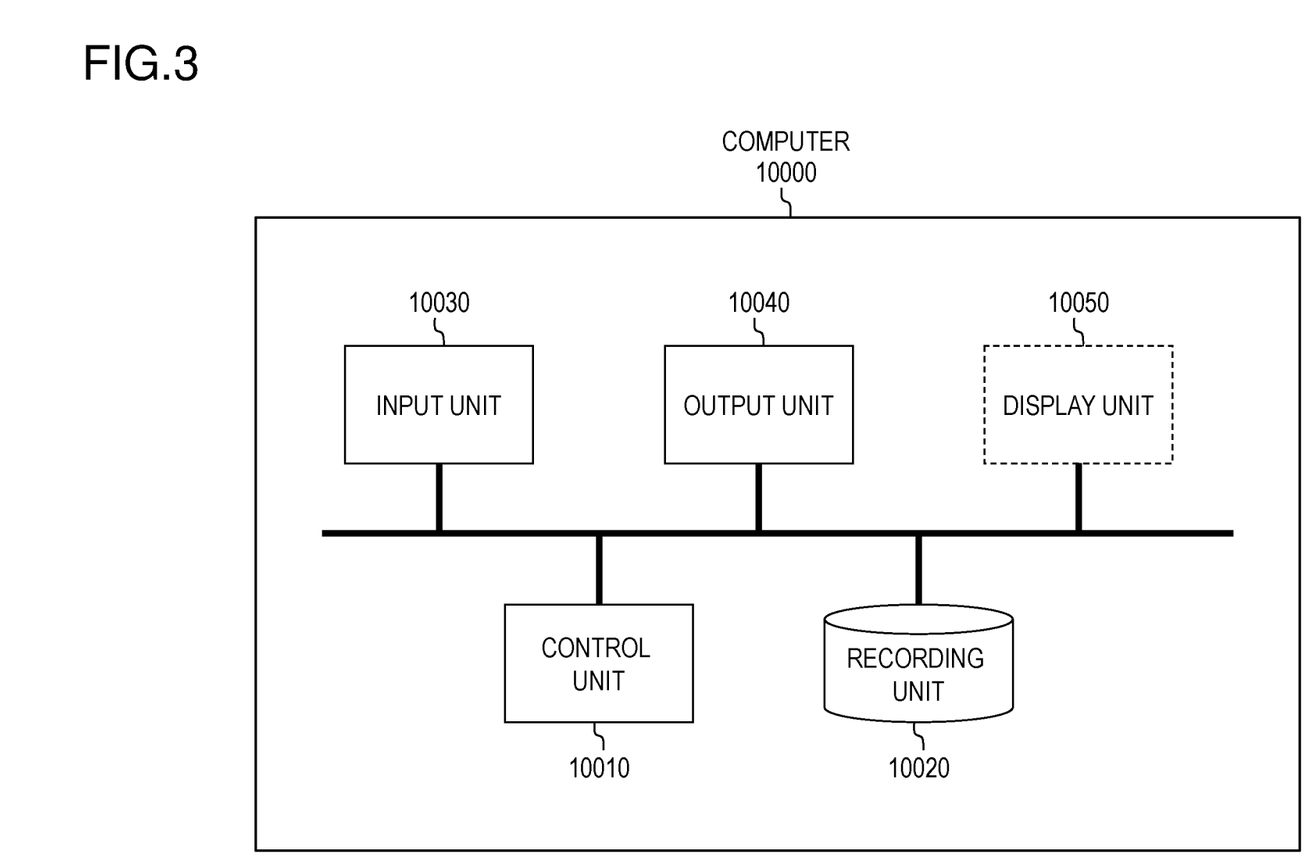
FIG. 3 is a diagram illustrating an example of a functional configuration of a computer.

The various types of processing described above can be performed by causing a recording unit 10020 of the computer illustrated in FIG. 3 to read a program for executing each of steps of the above method and causing a control unit 10010, an input unit 10030, an output unit 10040, and the like to execute the program.

The program in which the processing content is described can be recorded on a computer-readable recording medium. The computer-readable recording medium, for example, may be any type of medium such as a magnetic recording device, an optical disc, a magneto-optical recording medium, or a semiconductor memory. Specifically, for example, a hard disk device, a flexible disk, a magnetic tape, or the like can be used as the magnetic recording device, a digital versatile disc (DVD), a DVD-random access memory (RAM), a compact disc read only memory (CD-ROM), CD-R (Recordable)/RW (ReWritable), or the like can be used as the optical disc, a magneto-optical disc (MO) or the like can be used as the magneto-optical recording medium, and an electrically erasable and programmable-read only memory (EEPROM) or the like can be used as the semiconductor memory.

In addition, the program is distributed, for example, by selling, transferring, or lending a portable recording medium such as a DVD or a CD-ROM with the program recorded on it. Further, the program may be stored in a storage device of a server computer and transmitted from the server computer to another computer via a network, so that the program is distributed.

For example, a computer executing the program first temporarily stores the program recorded on the portable recording medium or the program transmitted from the server computer in its own storage device. When the computer executes the process, the computer reads the program stored in the recording medium of the computer and executes a process according to the read program. Further, as another execution mode of this program, the computer may directly read the program from the portable recording medium and execute processing in accordance with the program, or, further, may sequentially execute the processing in accordance with the received program each time the program is transferred from the server computer to the computer. In addition, another configuration may be employed to execute the processing through a so-called application service provider (ASP) service in which processing functions are implemented just by issuing an instruction to execute the program and obtaining results without transmitting the program from the server computer to the computer. Further, the program in this mode is assumed to include information which is provided for processing of a computer and is equivalent to a program (data or the like that has characteristics of regulating processing of the computer rather than being a direct instruction to the computer).

Although the hardware entity is provided by a computer executing a predetermined program, in the present embodiment, at least a part of the processing content may be implemented by hardware.

The invention claimed is:

1. An encrypted data analysis device comprising:
   wherein an [x] represents encrypted data of an x,
   processing circuitry configured to
   sort by [Time Information] and then sort by [User ID] an encrypted data set group including a plurality of encrypted data sets, each of the plurality of encrypted data sets including a [Location ID], the [User ID], and the [Time Information] obtained by having encrypted analysis target data of an analysis target data set of a Location ID, a User ID, and Time Information respectively by another device, wherein the analytical target data of the analysis target data set represents unencrypted data that indicate a certain user stays at a certain location at certain time;
   generate a [Flow] by extracting the [Location ID] according to the number of hops in a sorted order, the number of hops corresponding to the number of transitions between preset locations, and by further encoding the extracted [Location ID], wherein the [Flow] represents encoded flow information that is generated by without decrypting the encrypted data set group;
   storing the [Flow] in a memory device;
   determine whether a [User ID] and another [User ID] adjacent to each other are equal, and when not equal, replace a corresponding [Flow] with a [predetermined value that represents invalid] in the memory device;
   modifying the [Flow] stored in the memory device as valid data by deleting the [predetermined value that represents invalid] from the [Flow].

2. The encrypted data analysis device according to claim 1, comprising
   processing circuitry configured to
   replace a corresponding [Flow] with the [predetermined value that represents invalid] in a case where two pairs of a [Flow] and a [User ID] adjacent to each other are equal.

3. The encrypted data analysis device according to claim 2, comprising
   processing circuitry configured to
   generate a [Count] corresponding to a result of tabulating the number of [Flows] whose decryption result is identical.

4. A non-transitory computer readable medium that stores a program for causing a computer to operate as the encrypted data analysis device according to claim 2.

5. The encrypted data analysis device according to claim 1, comprising
   processing circuitry configured to
   generate a [Count] corresponding to a result of tabulating the number of [Flows] whose decryption result is identical.

6. The encrypted data analysis device according to claim 3, comprising
   in a case where the [Count] is less than or equal to a predetermined threshold value or less than a predetermined threshold value, processing circuitry configured to replace a corresponding [Flow] with the [predetermined value that represents invalid] and replace a corresponding [Count] with [0].

7. The encrypted data analysis device according to claim 6, comprising
   in a case where the [Count] is less than or equal to a predetermined threshold value or less than a predetermined threshold value, processing circuitry configured to replace a corresponding [Flow] with the [predetermined value that represents invalid] and replace a corresponding [Count] with [0].

8. A non-transitory computer readable medium that stores a program for causing a computer to operate as the encrypted data analysis device according to claim 6.

9. A non-transitory computer readable medium that stores a program for causing a computer to operate as the encrypted data analysis device according to claim 5.

10. A non-transitory computer readable medium that stores a program for causing a computer to operate as the encrypted data analysis device according to claim 1.

11. An encrypted data analysis method comprising a plurality of steps of a process executed by a processor, the encrypted data analysis method comprising:
    wherein an [x] represents encrypted data of an x,
    sorting by [Time Information] and then sort by [User ID] an encrypted data set group including a plurality of encrypted data sets, each of the plurality of encrypted data sets including a [Location ID], the [User ID], and the [Time Information] obtained by having encrypted analysis target data of an analysis target data set of a Location ID, a User ID, and Time Information respectively by another device, wherein the analytical target data of the analysis target data set represents unencrypted data that indicate certain user stays at a certain location at certain time;

generating a [Flow] by extracting the [Location ID] according to the number of hops in a sorted order, the number of hops corresponding to the number of transitions between preset locations, and by further encoding the extracted [Location ID], wherein the [Flow] represents encoded flow information that is generated by without decrypting the encrypted data set group;

storing the [Flow] in a memory device;

determining whether a [User ID] and another [User ID] adjacent to each other are equal, and when not equal, replacing a corresponding [Flow] with a [predetermined value that represents invalid] in the memory device;

modifying the [Flow] stored in the memory device as valid data by deleting the [predetermined value that represents invalid] from the [Flow];

transmitting the [Flow] over a network; and decrypting, by said another processor, the [Flow], subsequent to receiving the [Flow] from the encrypted data analysis device over the network.

12. The encrypted data analysis method according to claim 11, comprising
replacing a corresponding [Flow] with the [predetermined value that represents invalid] in a case where two pairs of a [Flow] and a [User ID] adjacent to each other are equal.

13. The encrypted data analysis method according to claim 12, comprising
generating a [Count] corresponding to a result of tabulating the number of [Flows] whose decryption result is identical.

14. A non-transitory computer readable medium that stores a program for causing a computer to operate as an encrypted data analysis device comprising a processor executing the encrypted data analysis method according to claim 12.

15. The encrypted data analysis method according to claim 11, comprising
generating a [Count] corresponding to a result of tabulating the number of [Flows] whose decryption result is identical.

16. A non-transitory computer readable medium that stores a program for causing a computer to operate as an encrypted data analysis device comprising a processor executing the encrypted data analysis method according to claim 11.

* * * * *